(12) United States Patent
Curtis

(10) Patent No.: US 9,074,580 B2
(45) Date of Patent: Jul. 7, 2015

(54) STAGGERED MULTI-LEVEL VERTICAL AXIS WIND TURBINE

(76) Inventor: Tom B. Curtis, Lake Oswego, OR (US)

( * ) Notice: Subject to any disclaimer, the term of this patent is extended or adjusted under 35 U.S.C. 154(b) by 739 days.

(21) Appl. No.: 13/365,123

(22) Filed: Feb. 2, 2012

(65) Prior Publication Data

US 2012/0201666 A1    Aug. 9, 2012

Related U.S. Application Data

(60) Provisional application No. 61/462,749, filed on Feb. 8, 2011.

(51) Int. Cl.
*F03D 3/02*    (2006.01)
*F03D 3/04*    (2006.01)
*F03D 3/06*    (2006.01)

(52) U.S. Cl.
CPC ............... *F03D 3/0427* (2013.01); *F03D 3/02* (2013.01); *F03D 3/0409* (2013.01); *F03D 3/061* (2013.01); *F05B 2240/216* (2013.01); *Y02E 10/74* (2013.01)

(58) Field of Classification Search
CPC ....... F03D 3/02; F03D 3/0409; F03D 3/0427; F03D 3/061; F05B 2240/216
USPC .......... 290/44, 55; 415/2.1, 4.1, 4.2, 4.4, 905, 415/907; 416/197 R, 197 A, 197 B, 198 R, 416/200 R
See application file for complete search history.

(56) References Cited

U.S. PATENT DOCUMENTS

| | | | |
|---|---|---|---|
| 346,797 A * | 8/1886 | Aylsworth | 416/117 |
| 588,060 A * | 8/1897 | Pruit | 416/143 |
| 802,144 A * | 10/1905 | Harrington | 416/41 |
| 964,374 A | 7/1910 | Bey | |
| 1,015,695 A * | 1/1912 | Liston | 415/155 |
| 1,248,305 A | 11/1917 | Gallagher | |
| 1,595,578 A | 8/1926 | Sovereign | |
| 1,764,052 A * | 6/1930 | Pfeifer | 415/186 |
| 3,938,907 A | 2/1976 | Magoveny et al. | |
| 3,994,621 A | 11/1976 | Bogie | |
| 4,047,834 A | 9/1977 | Magoveny et al. | |
| 4,142,822 A | 3/1979 | Herbert et al. | |
| 4,269,563 A | 5/1981 | Sharak et al. | |

(Continued)

FOREIGN PATENT DOCUMENTS

JP    2004285968 A  *  10/2004  ............... F03D 3/02
JP    5148762 B1 *  2/2013
(Continued)

*Primary Examiner* — Edward Look
*Assistant Examiner* — Christopher R Legendre
(74) *Attorney, Agent, or Firm* — David A. Crowther (57) ABSTRACT

A staggered multi-level vertical axis wind turbine includes a cage structure including wind directing elements arranged circumferentially about outer edges thereof. Within the cage structure is a rotor including a centrally located shaft orientated along an axis and extending at least from one end of the cage structured to another end. The rotor includes a first rotor level of torque generating elements of a first type coupled to the shaft. The rotor includes a second rotor level of torque generating elements of a second type coupled to the shaft. The rotor includes a third rotor level including torque generating elements of the first type coupled to the shaft. The wind directing elements receive and re-direct wind onto the torque generating elements of the various levels, thereby producing torque and causing the rotor to spin. The rotor is coupled to an electrical generator, which generates clean and renewable energy.

19 Claims, 7 Drawing Sheets

(56) References Cited

U.S. PATENT DOCUMENTS

| | | | |
|---|---|---|---|
| 4,318,019 A | 3/1982 | Teasley et al. | |
| 4,414,477 A | 11/1983 | Mewburn-Crook et al. | |
| 4,725,194 A | 2/1988 | Bartsch | |
| 4,834,610 A | 5/1989 | Bond, III | |
| 5,126,584 A | 6/1992 | Ouellet | |
| 5,195,871 A * | 3/1993 | Hsech-Pen | 416/12 |
| 5,375,968 A | 12/1994 | Kollitz et al. | |
| 5,391,926 A | 2/1995 | Staley et al. | |
| 5,808,369 A * | 9/1998 | Whelan | 290/55 |
| 5,852,331 A | 12/1998 | Giorgini | |
| 6,191,496 B1 | 2/2001 | Elder | |
| 6,465,899 B2 | 10/2002 | Roberts | |
| 6,518,680 B2 | 2/2003 | McDavid, Jr. | |
| 6,948,905 B2 * | 9/2005 | Horjus | 415/4.2 |
| 7,094,017 B2 | 8/2006 | Kurita | |
| 7,321,173 B2 * | 1/2008 | Mann | 290/55 |
| 7,329,965 B2 | 2/2008 | Roberts et al. | |
| 7,467,923 B2 | 12/2008 | Rains | |
| 7,573,148 B2 | 8/2009 | Nica | |
| 7,696,635 B2 | 4/2010 | Boone | |
| 7,744,338 B2 | 6/2010 | Deruyter et al. | |
| 7,866,938 B2 | 1/2011 | Kariya | |
| 7,896,608 B2 | 3/2011 | Whitworth et al. | |
| 7,922,452 B2 * | 4/2011 | Dulcetti Filho | 416/117 |
| 7,944,075 B2 * | 5/2011 | Boone | 290/55 |
| 8,382,435 B2 * | 2/2013 | Deeley | 416/139 |
| 2006/0222483 A1 | 10/2006 | Seiford | |
| 2008/0258468 A1 * | 10/2008 | Fuller | 290/55 |
| 2009/0001730 A1 * | 1/2009 | Kuo et al. | 290/55 |
| 2009/0184521 A1 | 7/2009 | Chong | |
| 2010/0187819 A1 * | 7/2010 | Leu | 290/44 |
| 2010/0213722 A1 | 8/2010 | Scott | |
| 2010/0254798 A1 | 10/2010 | Tutt | |
| 2010/0254808 A1 | 10/2010 | Kim et al. | |
| 2011/0057452 A1 | 3/2011 | Interlandi et al. | |
| 2011/0206526 A1 * | 8/2011 | Roberts | 416/223 R |
| 2011/0298214 A1 * | 12/2011 | Thompson | 290/44 |
| 2012/0201666 A1 * | 8/2012 | Curtis | 415/208.1 |

FOREIGN PATENT DOCUMENTS

| | | |
|---|---|---|
| WO | 2004074679 A2 | 9/2004 |
| WO | 2011022836 A1 | 3/2011 |

* cited by examiner

STAGGERED MULTI-LEVEL VERTICAL AXIS WIND TURBINE

RELATED APPLICATION DATA

This application claims the benefit of U.S. provisional patent application Ser. No. 61/462,749, filed Feb. 8, 2011, which is hereby incorporated by reference.

TECHNICAL FIELD

This disclosure relates to vertical axis wind turbines, and, more particularly, to a staggered multi-level vertical axis wind turbine.

BACKGROUND

The world is starved for energy—especially clean energy. As civilizations continue to expand at a rapid pace, current energy resources are being stretched to their limits. Many conventional energy resources emit dangerous toxins into the atmosphere. Established economies increasingly realize the need to diversify their energy resources so that they can become more independent, more environmentally friendly, and better overall stewards of their energy resources, thereby improving national security and reducing such emission that are caused by traditional energy sources such as coal and oil. The necessities and demands of third world economies are also quickly growing onto the world stage. Populations are surging. Energy is becoming more scarce, and as a result, the cost of energy is rising.

Alternative energy is now beginning to gain a foothold and find broader acceptance. Private individuals, businesses, and governments alike are looking for ways to integrate and adopt cleaner sources of energy. Windmills and turbines are now recognized as a truly clean and renewable source of energy. Moreover, as energy storage technologies improve, wind energy can be stored overnight when demand for energy is lower, and then deposited to the electrical grid during the day when demand for energy is higher. The assimilation of such technologies is making wind supported energy more attractive.

Nevertheless, conventional windmills and wind turbines can suffer from cost and efficiency disadvantages relative to other alternative energy technologies. Particularly for the smaller home owner, installing a typical windmill or wind turbine is usually cost prohibitive. In addition, conventional technology is generally noisy and lacks the efficiency necessary to produce a sufficient return on investment.

Accordingly, a need remains for an improved wind turbine having high efficiency and low noise characteristics.

The foregoing and other features of the invention will become more readily apparent from the following detailed description, which proceeds with reference to the accompanying drawings.

DETAILED DESCRIPTION

Reference will now be made in detail to embodiments of the invention, examples of which are illustrated in the accompanying drawings. In the following detailed description, numerous specific details are set forth to enable a thorough understanding of the present invention. It should be understood, however, that persons having ordinary skill in the art may practice the present invention without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first vane could be termed a second vane, and, similarly, a second vane could be termed a first vane, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
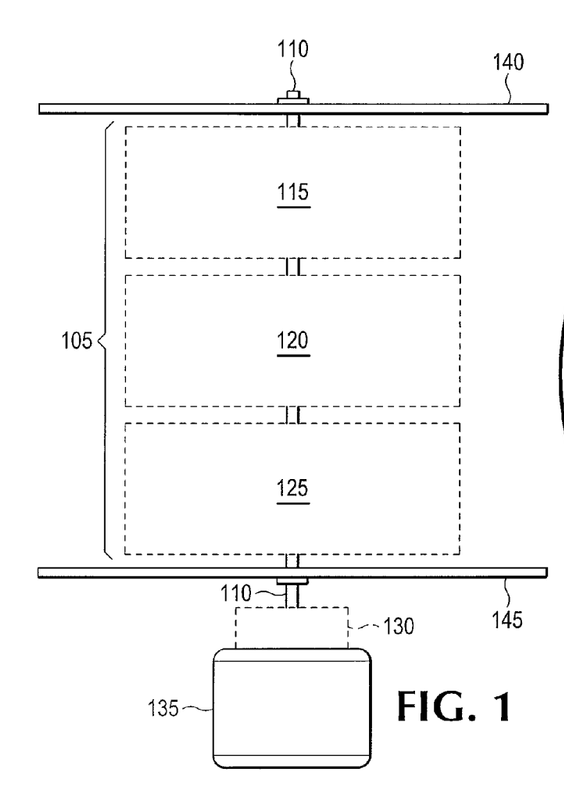
FIG. 1 illustrates a side elevation view of components of a vertical axis wind turbine, including a multi-level rotor, according to an example embodiment of the present invention.

FIG. 1 illustrates a side elevation view of components of a vertical axis wind turbine according to an example embodiment of the present invention. A rotor 105 includes a centrally located shaft 110 that is orientated along a defined axis, preferably a vertically situated axis relative to the surface of the Earth, and extends at least between an upper portion 140 and a lower portion 145 of an outer cage structure, which is described in further detail below. In some embodiments, the shaft 110 extends beyond one of the ends of the outer cage structure. Preferably, the rotor is made of steel, although any suitably rigid material can be used.

The rotor 105 includes multiple rotor levels such as levels 115, 120, and 125. Each rotor level includes torque generating elements, such as vanes, blades, scoops, or the like, as further described in detail below. Different types of vanes can be included within each rotor level. It will be understood that while the rotor 105 includes three different levels, any suitable number of levels can be used. For example, the rotor 105 can include two, three, four, five, or more different rotor levels.

The torque generating elements associated with one level can be staggered relative to the torque generating elements of another level. For example, the torque generating elements of rotor level 115 can be staggered relative to the torque generating elements of rotor level 120. Similarly, the torque generating elements of rotor level 125 can be staggered relative to the torque generating elements of levels 115 and 120. It will be understood that while the different rotor levels 115, 120, and 125 of FIG. 1 are illustrated as spaced apart one from another, in some embodiments the rotor levels are adjacent to each other.

In some embodiments, a gear box 130 is coupled to the centrally located shaft 110. It will be understood that the gear box 130 is optional, and alternatively, the centrally located shaft is directly coupled to an electric generator 135. If a gear box is used, the electric generator 135 can be coupled to the gearbox, and structured to produce electricity in response to rotation of the rotor 105, which is driven by wind energy striking the torque generating elements associated with each rotor level. If a gear box is not used, the electric generator 135 can be coupled to the centrally located shaft 110, and structured to produce electricity in response to rotation of the rotor 105, which is driven by wind energy striking the torque generating elements associated with each rotor level. It will be understood that the gear box 130 and/or the electric generator 135 can be coupled to the centrally located shaft 110 in a variety of suitable ways, and need not be positioned or located as shown.

Figure 2:
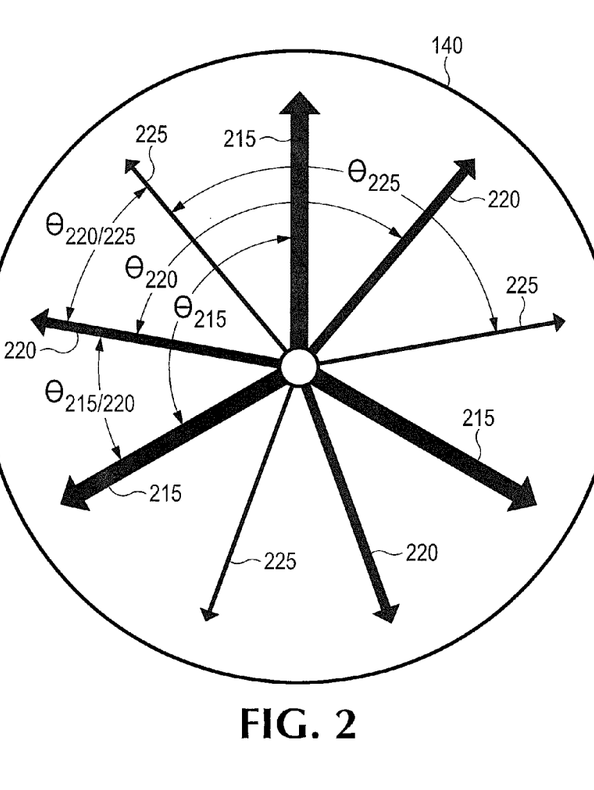
FIG. 2 illustrates a plan view of a vertical axis wind turbine, including representative levels and angles of certain components of the rotor of FIG. 1.

FIG. 2 illustrates a plan view of a vertical axis wind turbine, including representative levels, directions, and angles of certain components of the rotor of FIG. 1. The arrows illustrated in FIG. 2 are representative of directions in which components are situated within each level. The thicknesses of the arrows are representative of the level, be it rotor level 115, 120, or 125. The angles indicate the relative spacing between the components of each level, and between levels.

For example, the thickest directional arrows 215 are representative of torque generating elements within level 115 (of FIG. 1). The medium thick directional arrows 220 are representative of torque generating elements within level 120 (of FIG. 1). Similarly, the thinnest directional arrows 225 are representative of torque generating elements within level 125 (of FIG. 1). Each level can have associated therewith three different torque generating elements, which can generally be positioned in the direction of the corresponding directional arrows.

In other words, the torque generating elements, such as vanes of a particular rotor level, can be spaced evenly at intervals around the centrally located shaft 110. Moreover, each rotor level can be staggered relative to another rotor level so that each of the torque generating elements is staggered relative to each other.

The angles illustrated in FIG. 2 show an exemplary configuration of the positioning of the torque generating elements relative to each other within each particular rotor level, and relative to torque generating elements of other levels.

More specifically, the torque generating elements of rotor level 115 can extend along directions 215. An angle $\Theta_{215}$ defines the angle between each of the torque generating elements of rotor level 115 (of FIG. 1). The angle $\Theta_{215}$ is preferably 120 degrees or thereabout. An angle $\Theta_{220}$ defines the angle between each of the torque generating elements of rotor level 120 (of FIG. 1). The angle $\Theta_{220}$ is preferably 120 degrees or thereabout. An angle $\Theta_{225}$ defines the angle between each of the torque generating elements of rotor level 125 (of FIG. 1). The angle $\Theta_{225}$ is preferably 120 degrees or thereabout.

As previously mentioned, the torque generating elements of each level are staggered with respect to other levels. An angle $\Theta_{215/220}$ defines the angle between the torque generating elements of rotor level 115 (of FIG. 1) and the torque generating elements of rotor level 120 (of FIG. 1). In other words, the torque generating elements of rotor level 115 can be either $\Theta_{215/220}$ ahead or $\Theta_{215/220}$ behind the torque generating elements of rotor level 120. The angle $\Theta_{215/220}$ is preferably 40 degrees or thereabout.

Similarly, an angle $\Theta_{220/225}$ defines the angle between the torque generating elements of rotor level 120 (of FIG. 1) and the torque generating elements of rotor level 125 (of FIG. 1). In other words, the torque generating elements of rotor level 120 can be either $\Theta_{220/225}$ ahead or $\Theta_{220/225}$ behind the torque generating elements of rotor level 125. The angle $\Theta_{220/225}$ is preferably 40 degrees or thereabout. In this manner, torque generating elements are spaced at 40 degrees apart to complete a full 360 degrees spread of torque generating elements among three different rotor levels. It will be understood that the spacing of the torque generating elements is based on the directional arrows shown in FIG. 2, which are representative of the general direction of each torque generating element as they extend radially about the defined vertical axis of the centrally located shaft 110.

Figure 3:
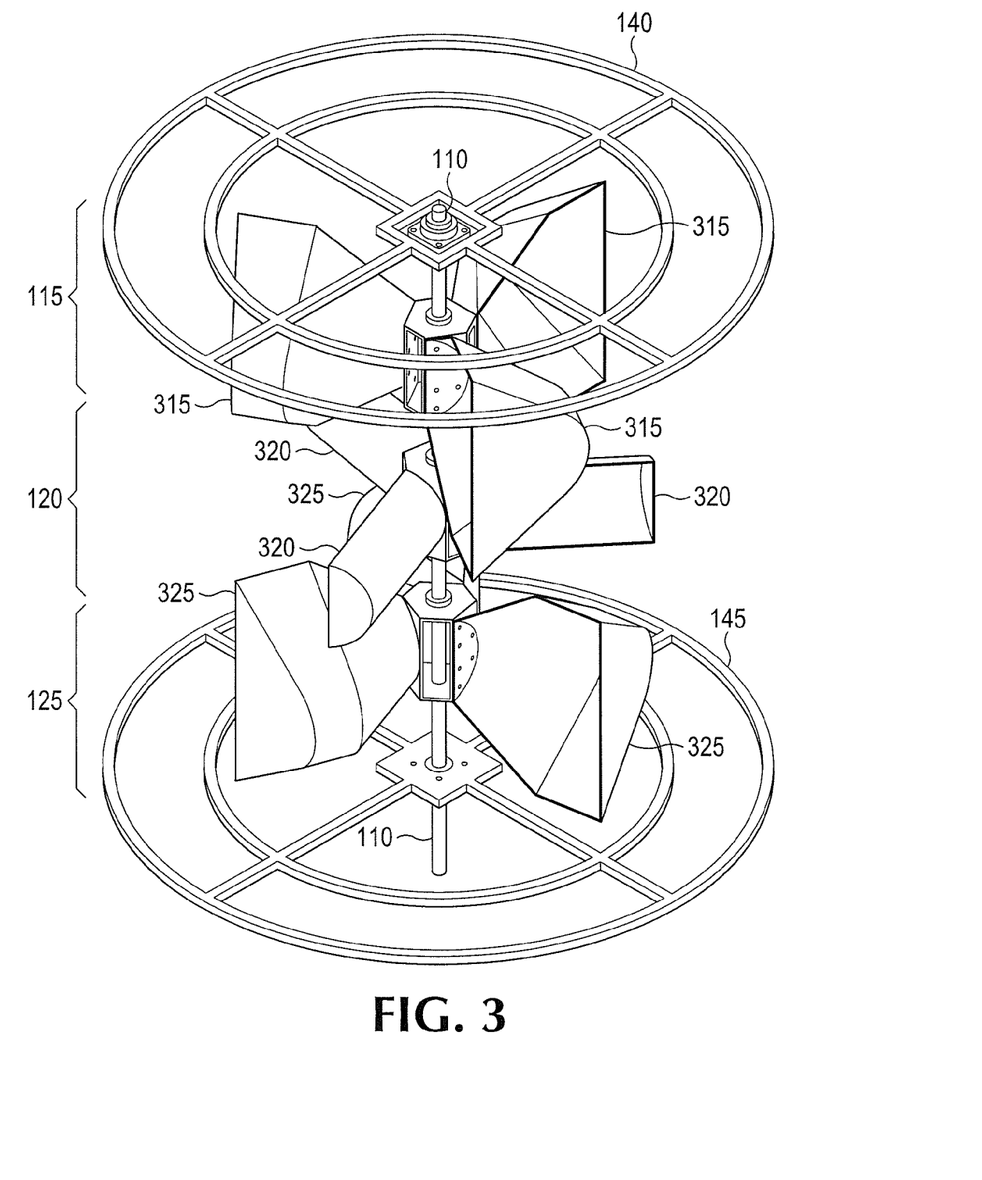
FIG. 3 illustrates a perspective view of components of a vertical axis wind turbine, including a multi-level rotor, according to another example embodiment of the present invention.

FIG. 3 illustrates a perspective view of components of a vertical axis wind turbine, including a multi-level rotor, according to another example embodiment of the present invention. The centrally located shaft 110 and the rotor levels 115, 120, and 125 of FIG. 3 correspond to a more specific example of the rotor 105 of FIG. 1.

The first rotor level 115 includes torque generating elements 315, which are coupled to the shaft 110. Each of the torque generating elements 315 are of a first type. Specifically, the torque generating elements 315 are scoop vanes. The scoop vanes can extend radially about the defined axis 110 in the general directions indicated by arrows 215 (of FIG. 2). In other words, the scoop vanes can extend in a substantially perpendicular direction relative to the centrally located shaft 110.

The second rotor level 120 includes torque generating elements 320, which are coupled to the shaft 110. Each of the torque generating elements 320 are of a second type different from the first type. Specifically, the torque generating elements 320 are substantially semi-cylindrical vanes. The semi-cylindrical vanes can have a substantially semi-circular cross-sectional configuration. The semi-cylindrical vanes can extend radially about the defined axis 110 in the general directions indicated by arrows 220 (of FIG. 2). In other words, the semi-cylindrical vanes can extend in a substantially perpendicular direction relative to the centrally located shaft 110.

The third rotor level 125 includes torque generating elements 325, which are coupled to the shaft 110. Each of the torque generating elements 325 are of the first type, or in other words, are scoop vanes. The scoop vanes can extend radially about the defined axis 110 in the general directions indicated by arrows 225 (of FIG. 2). In other words, the scoop vanes can extend in a substantially perpendicular direction relative to the centrally located shaft 110.

The torque generating elements 315 are spaced evenly at intervals around the centrally located shaft 110. The torque generating elements 320 are also spaced evenly at intervals around the centrally located shaft 110, and are staggered relative to the torque generating elements 315. The torque generating elements 325 are spaced evenly at intervals around the centrally located shaft 110, and are staggered relative to the torque generating elements 315 and relative to the torque generating elements 320.

The torque generating elements 315 include three vanes spaced at 120 degrees apart one from another. The torque generating elements 320 include three vanes spaced at 120 degrees apart one from another. And the torque generating elements 325 include three vanes spaced at 120 degrees apart one from another. The torque generating elements 320 are staggered by 40 degrees relative to the torque generating elements 315. Similarly, the torque generating elements 325 are staggered by 40 degrees relative to the torque generating elements 320.

It will be understood that two or more different types of torque generating elements can be used. For example, each rotor level (e.g., 115, 120, and 125) can have associated therewith its own type of torque generating elements. It will also be understood that different types of torque generating elements can be used within the same rotor level. Examples of different types of torque generating elements are discussed in further detail below.

Figure 4:
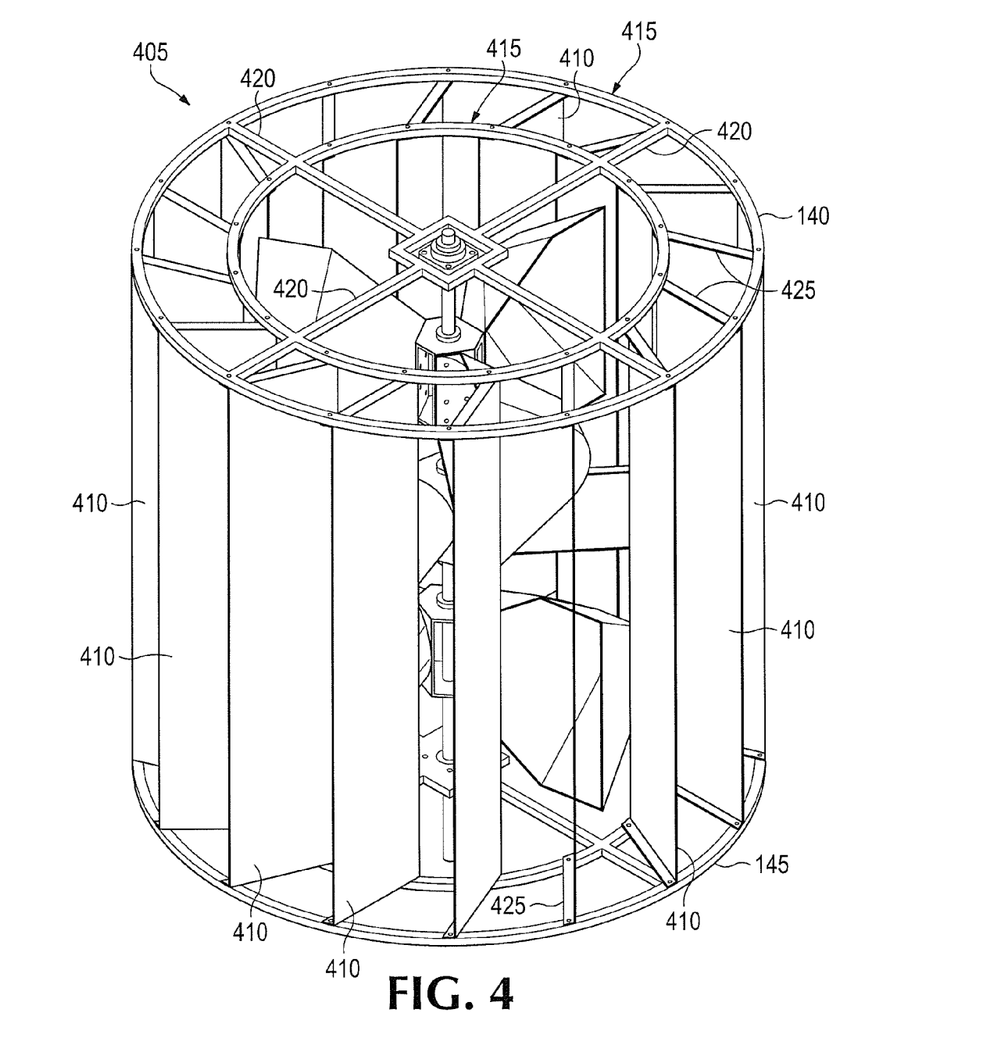
FIG. 4 illustrates a perspective view of a vertical axis wind turbine including an outer cage structure, according to yet another example embodiment of the present invention.
Figure 5:
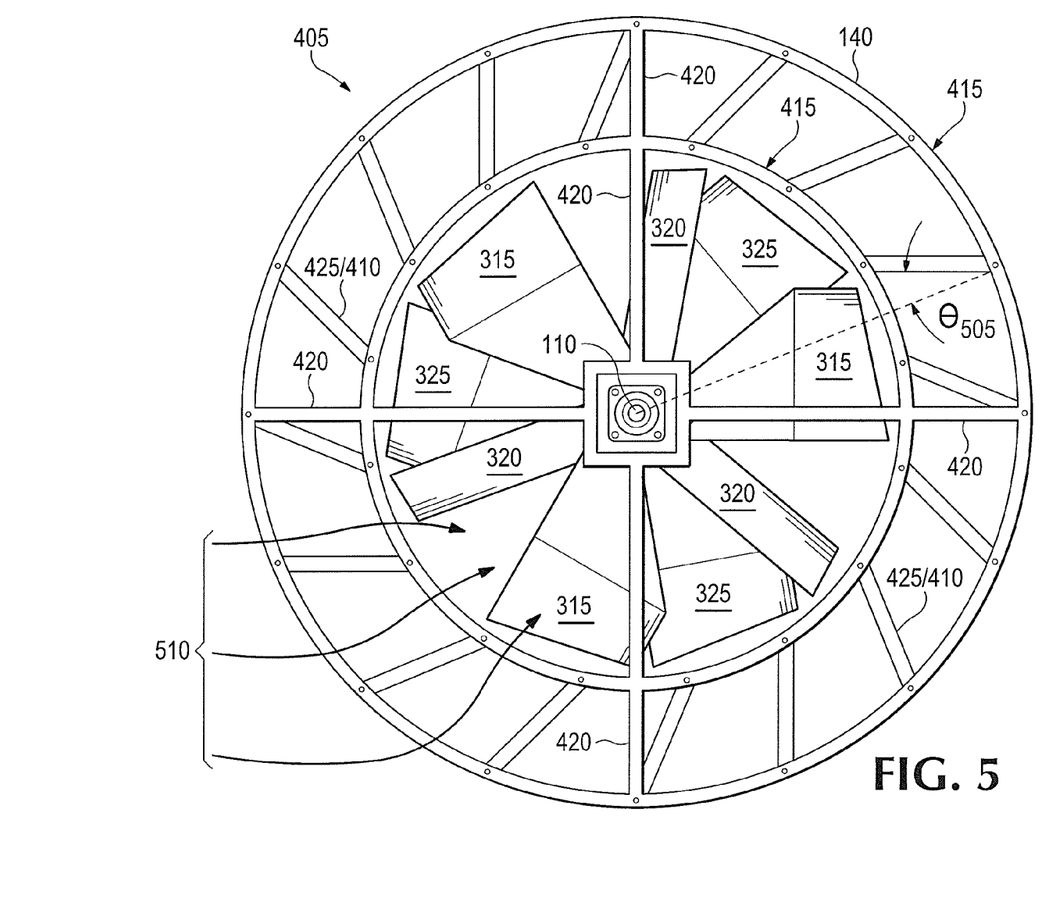
FIG. 5 illustrates a plan view of the vertical axis wind turbine of FIG. 4.
Figure 6A:
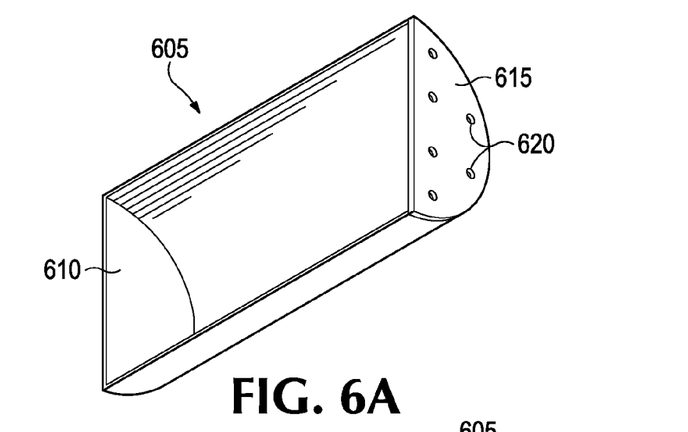
FIGS. 6A-6D illustrate different views of a semi-cylindrical vane according to still another example embodiment of the present invention.
Figure 6B:
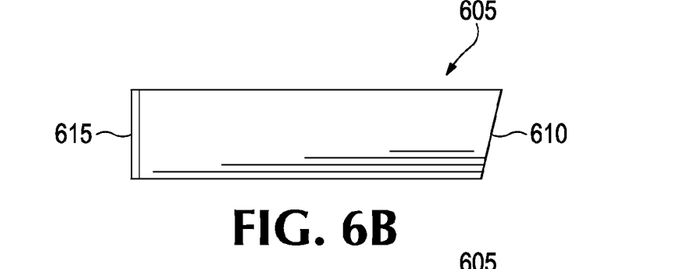
Figure 6C:
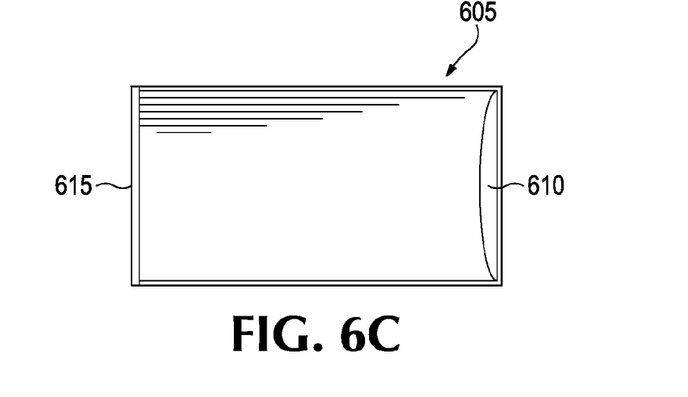
Figure 6D:
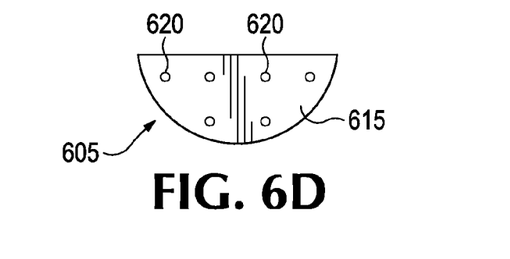
Figures 7A, 7B, 7C:
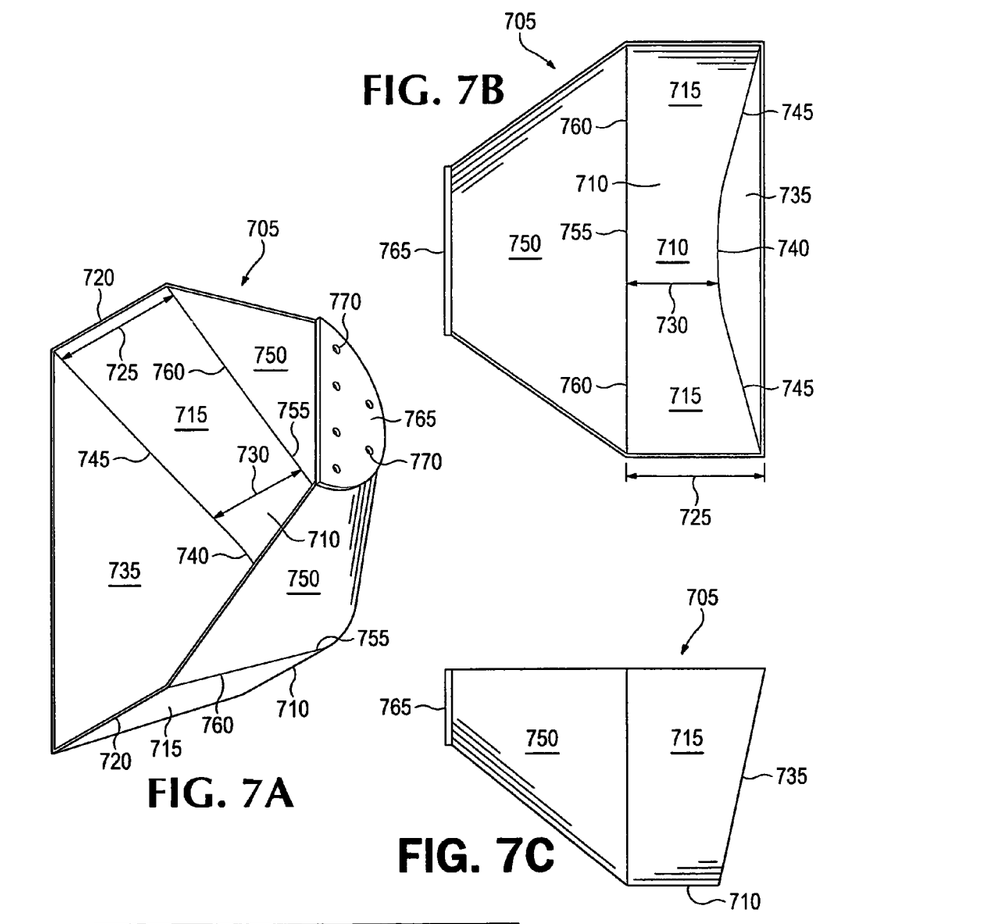
FIGS. 7A-7D illustrate different views of a scoop vane according to another example embodiment of the present invention.
Figure 7D:
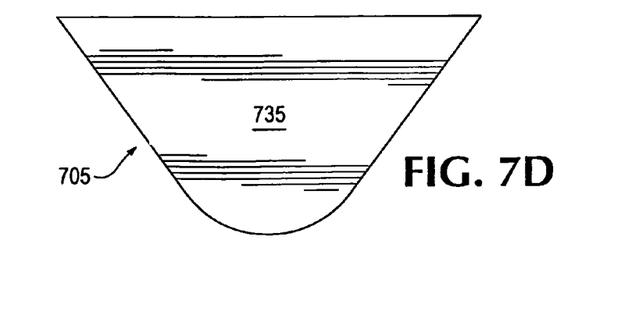

FIG. 4 illustrates a perspective view of a vertical axis wind turbine including an outer cage structure 405, according to yet another example embodiment of the present invention. FIG. 5 illustrates a plan view of the vertical axis wind turbine of FIG. 4. Reference is now made to FIGS. 4 and 5.

The outer cage structure 405 can include an upper portion 140, a lower portion 145, and wind directing elements 410. The upper portion 140 and the lower portion 145 can be spaced apart by about sixty (60) inches or thereabout. The upper portion 140 and the lower portion 145 can include concentric annular supports (e.g., 415) and cross supports (e.g., 420) for rigidifying the outer cage 405. The outer most annular support, which defines the outer boundaries of the cage structure, is preferably sixty (60) inches in diameter or thereabout. The centrally located shaft 110 can be seventy-two (72) inches in length or thereabout, and between one (1) to two (2) inches in diameter, or thereabout, and can extend beyond the lower portion 145 of the cage structure. It will be understood that the inventive concepts as disclosed herein are not limited to particular measurements, but the components described herein can be of larger or smaller sizes, and still fall within the scope of disclosed embodiments of the invention.

The wind directing elements 410 can be arranged circumferentially about outer edges of the outer cage structure 405, and are stationary relative to the rotor 105. In other words, the wind directing elements 410 do not rotate, but rather, are fixed to the cage structure 405. Preferably, the wind directing elements 410 are substantially planar vanes 410, which can be configured at an angle $\Theta_{505}$ relative to the centrally located shaft 110, as shown in FIG. 5. The angle $\Theta_{505}$ is preferably twenty (20) degrees or thereabout. It will be understood, however, that the angle $\Theta_{505}$ can be between one (1) degree and forty-five (45) degrees, or thereabout. The wind directing elements 410 can each include a flange 425 on one or both ends to facilitate connecting the wind directing elements 410 to the upper portion 140 and the lower portion 145 of the cage structure 405.

The vanes 410 are configured to compress and redirect wind 410 onto the torque generating elements (e.g., 315, 320, and 325) of the rotor 105. The rotor 105, as described herein, is substantially enclosed and rotates within the outer cage structure 405 efficiently and quietly. The angle $\Theta_{505}$ is selected so that drag on the back side of the scoop vanes is reduced or eliminated, and all or substantially all of the wind is directed to the front of each scoop vane. The curves and structure of the scoop vanes are structured to "catch" the wind and with greater torque, cause the centrally located shaft to rotate.

The wind directing elements 410 can be fifty-eight (58) inches in length, or thereabout, and about 0.08 inch thick, or thereabout. Preferably, the wind directly elements are made of aluminum, although any suitably rigid material can be used. It will be understood that the inventive concepts as disclosed herein are not limited to particular measurements, but the components described herein can be of larger or smaller sizes, and still fall within the scope of disclosed embodiments of the invention.

When the wind 510 strikes the torque generating elements, torque is generated, thereby causing the rotor 105 to spin. It will be understood that while the wind 510 is shown as entering the cage structure 405 from a particular direction, the wind 510 can enter the cage structure 405 from any direction, which contributes to the torque generation and rotation of the rotor 105.

FIGS. 6A-6D illustrate different views of a semi-cylindrical vane according to still another example embodiment of the present invention. Reference is now made to FIGS. 6A through 6D.

The torque generating elements 320 (of FIG. 3) include a semi-cylindrical vane 605. The semi-cylindrical vane 605 can have a substantially semi-circular cross-sectional configuration. The semi-cylindrical vane 605 can include a first cap 610 disposed at a terminal end thereof and a second cap 615 disposed at a distal end thereof. The second cap 615 can be coupled to the centrally located shaft 110 using, for example, holes 620. Bolts, screws, dowels, pins, or the like, or any suitable securing means, can be used to secure the second cap 615 of each semi-cylindrical vane 605 to the centrally located shaft 110 through the holes 620. The first and second caps are configured to restrict movement of wind, thereby increasing the torque of the torque generating elements 320.

In some embodiments, the first cap 610 is tapered relative to the second cap 615. This enhances the torque as the wind flows into and across the first cap 610, reducing the drag coefficient, thereby increasing the rotational velocity of the rotor 105. The tapered first cap 610 can also deflect wind received from wind directing elements 410 to another different torque generating element, thereby increasing the efficiency of the turbine. Preferably, the semi-cylindrical vanes are made of aluminum, although any suitably rigid material can be used.

FIGS. 7A-7D illustrate different views of a scoop vane according to another example embodiment of the present invention. Reference is now made to FIGS. 7A through 7D.

The torque generating elements 315 and 325 (of FIG. 3) include a scoop vane 705. The scoop vane 705 can include an arched portion 710. Tapered sections 715 are adjacent to the arched portion 710 and extend outwardly toward outer edges 720 of the scoop vane 705. Preferably, the width 725 of the tapered sections 715 at the outer edges of the vane is greater than the width 730 of the tapered sections 715 adjacent to the arched portion 710.

The scoop vane 705 includes a mound-shaped cap 735 having edges 740 adjacent to edges of the arched portion 710 and having edges 745 adjacent to edges of the tapered sections 715 of the scoop vane 705. The mound-shaped cap 735 is configured to restrict movement of wind, thereby increasing the torque of the torque generating elements 315 and the torque generating elements 325.

The scoop vane 705 includes a semi-conical section 750 having edges 755 adjacent to edges of the arched portion 710 and having edges 760 adjacent to edges of the tapered sections 715 of the scoop vane 705. The semi-conical section 750 is coupled to the centrally located shaft 110. The scoop vanes are preferably made of aluminum, although any suitably rigid material can be used. The components and configuration of the scoop vanes reduce the drag coefficient and increase torque, thereby making the vertical axis wind turbine more efficient in the production of energy.

The semi-conical section 750 includes an end cap 765, which can have holes such as holes 770 disposed therein. Each scoop vane 705 can be coupled to the centrally located shaft 110 using, for example, holes 770. Bolts, screws, dowels, pins, or the like, or any suitable securing means, can be used to secure the end cap 765 of each scoop vane 705 to the centrally located shaft 110 through the holes 770.

Figure 8:
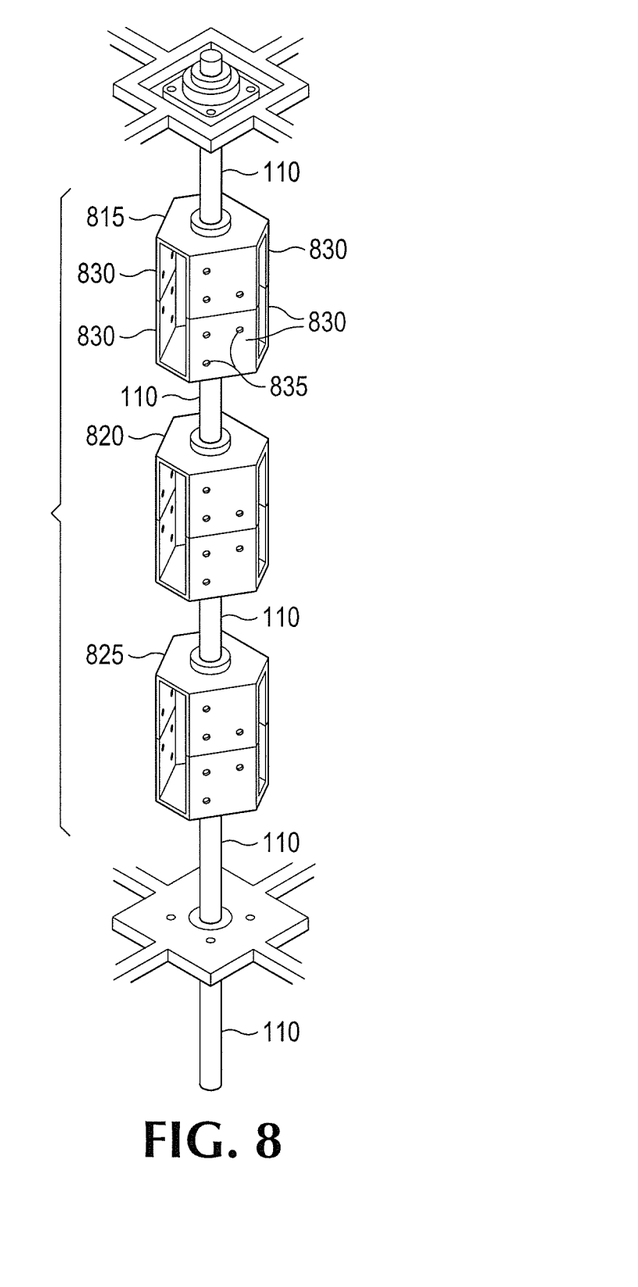
FIG. 8 illustrates a perspective view of certain components of a vertical axis wind turbine, including a centrally located shaft and hubs, according to another example embodiment of the present invention.

FIG. 8 illustrates a perspective view of certain components of a vertical axis wind turbine. The rotor 105 includes the centrally located shaft 110 and hubs (e.g., 815, 820, and 825), according to another example embodiment of the present invention.

More specifically, the rotor 105 includes a first hub section 815 associated with the first rotor level 115 and coupled to the centrally located shaft 110, a second hub section 820 associated with the second rotor level 120 and coupled to the centrally located shaft 110, and a third hub section 825 associated with the third rotor level 125 and coupled to the centrally located shaft 110.

Hub sections 815, 820, and 825 each include at least three outwardly facing surfaces (e.g., 830) spaced evenly at intervals around the centrally located shaft 110. The outwardly facing surfaces 830 are substantially planar and can include one or more different sections for attaching to the torque generating elements. For example, the outwardly facing surfaces 830 can include one or more holes (e.g., 835) for receiving and/or securing the different vanes to the centrally located shaft 110.

Each of the torque generating elements 315 is coupled to a corresponding one of the outwardly facing surfaces 830 of the first hub section 815. Similarly, each of the torque generating elements 320 is coupled to a corresponding one of the outwardly facing surfaces of the second hub section 820. And each of the torque generating elements 325 is coupled to a corresponding one of the outwardly facing surfaces of the third hub section 825. The hubs rotate simultaneously and at the same rotational rate because they are each coupled to and locked with the centrally located shaft 110. The hub sections are preferably made of aluminum, although any suitably rigid material can be used.

The wind directing elements receive and re-direct wind onto the scoop vanes and the semi-cylindrical vanes of the various levels, which produce torque on the hubs and cause the rotor to spin. The rotational power of the rotor is exploited to generate clean and renewable energy quietly and efficiently.

Although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms can reference the same or different embodiments that are combinable into other embodiments.

Consequently, in view of the wide variety of permutations to the embodiments described herein, this detailed description and accompanying material is intended to be illustrative only, and should not be taken as limiting the scope of the invention.

What is claimed is:

1. A rotor of a vertical axis wind turbine, comprising:
a centrally located shaft orientated along a defined axis;
a first rotor level including a first plurality of torque generating elements coupled to the shaft, each of the torque generating elements of the first plurality being of a first type and extending radially about the defined axis;
a second rotor level including a second plurality of torque generating elements coupled to the shaft, each of the torque generating elements of the second plurality being of a second type different from the first type and extending radially about the defined axis;
a third rotor level including a third plurality of torque generating elements coupled to the shaft, each of the torque generating elements of the third plurality being of the first type and extending radially about the defined axis;
a first hub section associated with the first rotor level and coupled to the centrally located shaft;
a second hub section associated with the second rotor level and coupled to the centrally located shaft; and
a third hub section associated with the third rotor level and coupled to the centrally located shaft,
wherein:
the first, second, and third hub sections each include at least three outwardly facing surfaces spaced evenly at intervals around the centrally located shaft;
each of the torque generating elements of the first plurality of torque generating elements is coupled to a corresponding one of the at least three outwardly facing surfaces of the first hub section;
each of the torque generating elements of the second plurality of torque generating elements is coupled to a corresponding one of the at least three outwardly facing surfaces of the second hub section; and
each of the torque generating elements of the third plurality of torque generating elements is coupled to a corresponding one of the at least three outwardly facing surfaces of the third hub section.

2. The rotor of claim 1, further comprising:
an electric generator coupled to the centrally located shaft.

3. A vertical axis wind turbine, comprising:
a cage structure including wind directing elements arranged circumferentially about outer edges thereof; and
a rotor configured to rotate within the cage structure, wherein the rotor includes:
a centrally located shaft orientated along a defined axis and extending at least from one end of the cage structure to another end of the cage structure;
a first rotor level including a first plurality of torque generating elements coupled to the shaft, each of the torque generating elements of the first plurality being of a first type and extending radially about the defined axis; and
a second rotor level including a second plurality of torque generating elements coupled to the shaft, each of the torque generating elements of the second plurality being of a second type different from the first type and extending radially about the defined axis, wherein:
the wind directing elements of the cage structure are stationary relative to the rotor;
the wind directing elements are planar vanes that are configured at an angle relative to the centrally located shaft; and
the planar vanes are configured to compress and redirect wind onto the torque generating elements.

4. The vertical axis wind turbine of claim 3, further comprising:
a third rotor level including a third plurality of torque generating elements coupled to the shaft, each of the torque generating elements of the third plurality being of the first type and extending radially about the defined axis.

5. The vertical axis wind turbine of claim 4, wherein:
the defined axis is vertical;
the first plurality of torque generating elements are spaced evenly at intervals around the centrally located shaft;
the second plurality of torque generating elements are staggered relative to the first plurality of torque generating elements;
the second plurality of torque generating elements are spaced evenly at intervals around the centrally located shaft;
the third plurality of torque generating elements are staggered relative to the first plurality of torque generating elements and relative to the second plurality of torque generating elements; and
the third plurality of torque generating elements are spaced evenly at intervals around the centrally located shaft.

6. The vertical axis wind turbine of claim 5, wherein:
the first plurality of torque generating elements include three vanes spaced at 120 degrees apart one from another;
the second plurality of torque generating elements include three vanes spaced at 120 degrees apart one from another;
the third plurality of torque generating elements include three vanes spaced at 120 degrees apart one from another;
the second plurality of torque generating elements are staggered by 40 degrees relative to the first plurality of torque generating elements; and
the third plurality of torque generating elements are staggered by 40 degrees relative to the second plurality of torque generating elements.

7. The vertical axis wind turbine of claim 3, further comprising:
an electric generator coupled to the centrally located shaft.

8. A rotor of a vertical axis wind turbine, comprising:
a centrally located shaft orientated along a defined axis;
a first rotor level including a first plurality of torque generating elements coupled to the shaft, each of the torque generating elements of the first plurality being of a first type and extending radially about the defined axis; and
a second rotor level including a second plurality of torque generating elements coupled to the shaft, each of the torque generating elements of the second plurality being of a second type different from the first type and extending radially about the defined axis,
wherein:
the first type of torque generating elements includes a scoop vane, and
the scoop vane includes:
an arched portion; and
tapered sections adjacent to the arched portion and extending outwardly toward outer edges of the vane, wherein the width of the tapered sections at the outer edges of the vane is greater than the width of the tapered sections adjacent to the arched portion.

9. The rotor of claim 8, further comprising:
a third rotor level including a third plurality of torque generating elements coupled to the shaft, each of the torque generating elements of the third plurality being of the first type and extending radially about the defined axis.

10. The rotor of claim 9, wherein:
the defined axis is vertical;
the first plurality of torque generating elements are spaced evenly at intervals around the centrally located shaft;
the second plurality of torque generating elements are staggered relative to the first plurality of torque generating elements;
the second plurality of torque generating elements are spaced evenly at intervals around the centrally located shaft;
the third plurality of torque generating elements are staggered relative to the first plurality of torque generating elements and relative to the second plurality of torque generating elements; and
the third plurality of torque generating elements are spaced evenly at intervals around the centrally located shaft.

11. The rotor of claim 10, wherein:
the first plurality of torque generating elements include three vanes spaced at 120 degrees apart one from another;
the second plurality of torque generating elements include three vanes spaced at 120 degrees apart one from another; and
the third plurality of torque generating elements include three vanes spaced at 120 degrees apart one from another.

12. The rotor of claim 11, wherein:
the second plurality of torque generating elements are staggered by 40 degrees relative to the first plurality of torque generating elements; and
the third plurality of torque generating elements are staggered by 40 degrees relative to the second plurality of torque generating elements.

13. The rotor of claim 9, wherein the scoop vane includes:
a mound-shaped cap having edges adjacent to edges of the arched portion and having edges adjacent to edges of the tapered sections of the scoop vane, wherein the mound-shaped cap is configured to restrict movement of wind, thereby increasing the torque of the first plurality of torque generating elements and the third plurality of torque generating elements.

14. The rotor of claim 9, further comprising:
a first hub section associated with the first rotor level and coupled to the centrally located shaft;
a second hub section associated with the second rotor level and coupled to the centrally located shaft; and
a third hub section associated with a third rotor level and coupled to the centrally located shaft.

15. The rotor of claim 14, wherein:
the first, second, and third hub sections each include at least three outwardly facing surfaces spaced evenly at intervals around the centrally located shaft;
each of the torque generating elements of the first plurality of torque generating elements is coupled to a corresponding one of the at least three outwardly facing surfaces of the first hub section;

each of the torque generating elements of the second plurality of torque generating elements is coupled to a corresponding one of the at least three outwardly facing surfaces of the second hub section; and each of the torque generating elements of the third plurality of torque generating elements is coupled to a corresponding one of the at least three outwardly facing surfaces of the third hub section.

16. The rotor of claim 8, wherein:

the second type of torque generating elements includes a semi-cylindrical vane having a first cap disposed at a terminal end thereof and a second cap disposed at a distal end thereof, the first and second caps configured to restrict movement of wind, thereby increasing the torque of the second plurality of torque generating elements.

17. The rotor of claim 16, wherein:

the first cap is tapered relative to the second cap.

18. The rotor of claim 8, wherein the scoop vane includes:

a semi-conical section having edges adjacent to edges of the arched portion and having edges adjacent to edges of the tapered sections of the scoop vane, wherein the semi-conical section is coupled to the centrally located shaft.

19. The rotor of claim 8, further comprising:

an electric generator coupled to the centrally located shaft.

* * * * *